United States Patent [19]

Adolfsson et al.

[11] 4,298,551
[45] Nov. 3, 1981

[54] APPLIANCE FOR MAKING AN AERATED BEVERAGE

[75] Inventors: Rune F. R. Adolfsson, Stockholm; Dietrich W. Gellert, Ekero, both of Sweden

[73] Assignee: Thorn Svenska A.B., Solna, Sweden

[21] Appl. No.: 62,943

[22] Filed: Aug. 2, 1979
(Under 37 CFR 1.47)

[51] Int. Cl.³ .............................................. B01F 3/04
[52] U.S. Cl. ................................. 261/121 R; 99/275;
99/323.1; 137/854; 137/859; 215/355; 222/563;
261/64 B; 261/DIG. 7
[58] Field of Search .............. 261/64 R, 64 B, 121 R,
261/122–124, DIG. 7; 222/563; 215/355, 361,
363; 137/854, 859; 99/275, 323.1, 323.2;
251/127

[56] References Cited

U.S. PATENT DOCUMENTS

| | | | |
|---|---|---|---|
| 2,173,571 | 9/1939 | Jesnig | 137/854 |
| 2,394,911 | 2/1946 | Griswold | 137/859 X |
| 2,600,901 | 6/1952 | Meldau | 261/DIG. 7 |
| 2,732,117 | 1/1956 | Hillis | 261/DIG. 7 |
| 2,805,846 | 9/1957 | Dewan | 261/DIG. 7 |
| 3,337,197 | 8/1967 | Iannelli | 261/DIG. 7 |
| 3,599,657 | 8/1971 | Maldavs | 261/DIG. 7 |
| 3,953,550 | 4/1976 | Gilbey | 261/64 R |
| 4,028,441 | 6/1977 | Richards | 261/DIG. 7 |

*Primary Examiner*—Richard L. Chiesa
*Attorney, Agent, or Firm*—Fleit & Jacobson

[57] ABSTRACT

An appliance for making an aerated beverage, e.g. for domestic use, comprising a casing in which is mounted a pressurized container of carbon dioxide which is controlled by a manually operable valve, the operation of which is worked by a finger actuable lever. A nozzle is connected to the valve to receive carbon dioxide therefrom and inject it into water in a bottle when the bottle is mounted with the nozzle immersed in the water. A flexible diaphragm surrounds the upper end of the nozzle and carries a stopper which closes the neck of the bottle when so mounted. A space is formed above the diaphragm which communicates with the interior of the bottle when mounted with the stopper in its neck, and the upwardly projected area of the diaphragm forming the lower wall of the space is greater than the downwardly projected area of the stopper, whereby the pressure of the carbon dioxide urges the stopper into engagement with the neck of the bottle, and an overpressure safety valve is provided in communication with the space above the diaphragm.

11 Claims, 4 Drawing Figures

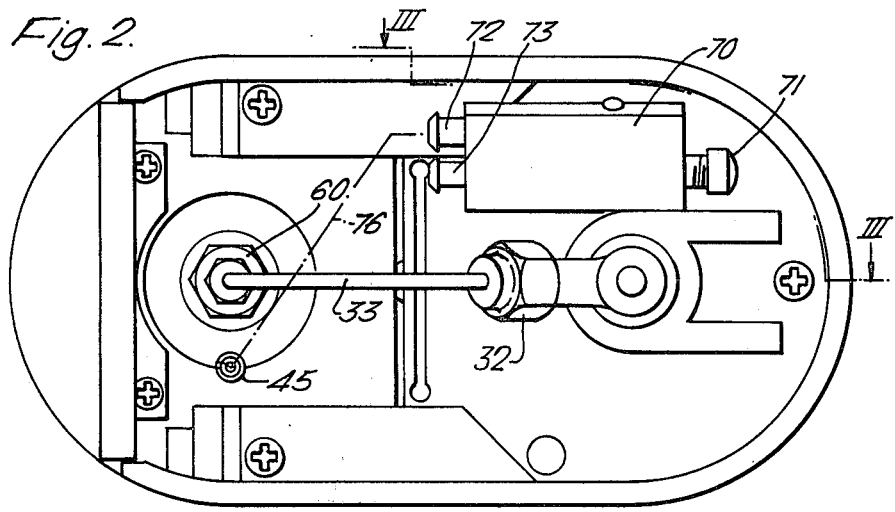
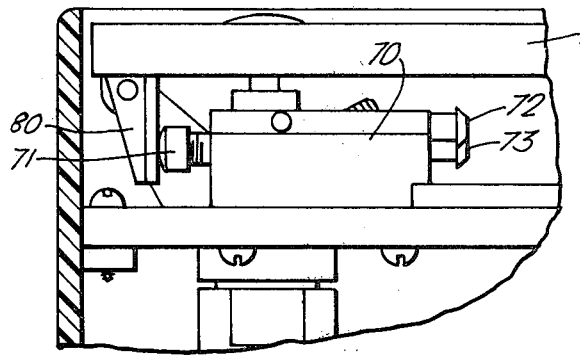
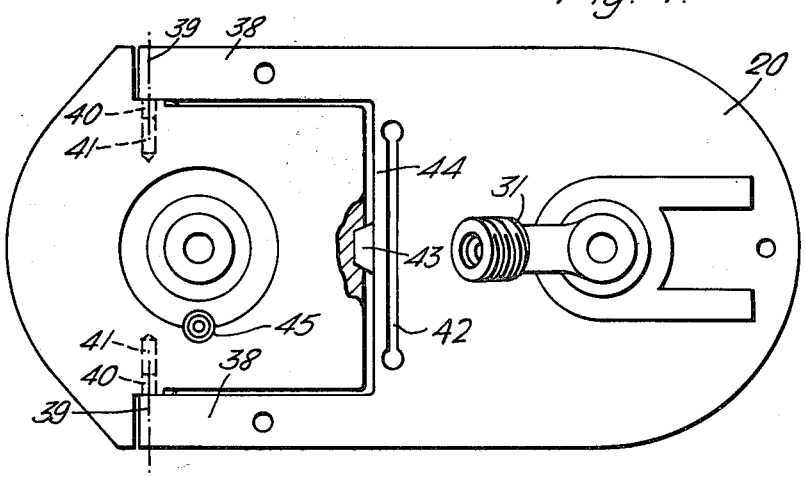

APPLIANCE FOR MAKING AN AERATED BEVERAGE

The present invention relates to an appliance for making an aerated beverage.

Appliances have been proposed for making aerated beverages in the home. One known form of such appliance includes a casing having means for mounting a container of pressurized carbon dioxide in the casing, a manually operable valve being provided to control the outflow of carbon dioxide from this container. A nozzle is connected to the valve to receive carbon dioxide from the valve and means are provided for mounting a bottle containing water in such a way that the nozzle is immersed in the water in the bottle. The appliance also includes an overpressure safety valve which can communicate with the interior of the bottle.

In one form, the means for mounting the bottle include a shatterproof housing, of metal, which surrounds the bottle, this shatterproof housing being pivotally mounted on the casing. The bottle is inserted into the shatterproof housing in such a way that the depending nozzle extends into water in the bottle. The housing is pivoted to a vertical position and a lever is operated to lift, by means of a cam, a table which urges the bottle upwardly against a stopper within the shatterproof housing. With the bottle so mounted, the manually operable valve is actuated and carbon dioxide is projected through the nozzle into the water and goes into solution. When the pressure reaches a preset value, the safety valve opens, usually making a buzzing sound, to indicate that the bottle can be removed.

In order to remove the bottle, the lever is actuated again so that the table is lowered and the housing is then pivoted out and the bottle removed. The aerated drink can simply be soda water or can have added to it a suitable flavouring concentrate or syrup to give drinks such as cola, tonic water etc.

These appliances are reasonably satisfactory, but they do require several operations before an aerated beverage can be made.

It is now proposed, according to the present invention, to provide an appliance for making an aerated beverage comprising a casing, means for mounting a container of pressurized carbon dioxide in said casing, a manually operable valve to control the outflow of carbon dioxide from said container, a nozzle connected to said manually operable valve to receive carbon dioxide from said valve, means for mounting a bottle containing water, so that the nozzle is immersed in the water in the bottle, a flexible diaphragm surrounding the upper end of the nozzle, a stopper carried by the diaphragm and closing the neck of the bottle when so mounted, a space formed above the diaphragm communicating with the interior of the bottle when mounted with the stopper in its neck, the upwardly projected area of the diaphragm forming a wall of the space being greater than the downwardly projected area of the stopper, whereby the pressure of the carbon dioxide urges the stopper into engagement with the neck of the bottle and an overpressure saftey valve communicating with the space above the diaphragm.

With such a construction, it is possible for the means to mount the bottle simply to be a portion of the casing so that there is no need to have any table which is lowered to insert the bottle and remove it, and raised during the pressurization phase. The flexible diaphragm is so constructed that, once carbon dioxide is introduced through the nozzle, the pressure of the carbon dioxide forces the diaphragm downwardly and thus urges the stopper into the bottle. The diaphragm acts, in effect, as a bellows so that there is no need to move the bottle at all in an upward direction.

Preferably, the mounting means includes a shatterproof housing which is pivotally mounted on the casing and a fixed portion of the casing for supporting the bottom of the bottle. The purpose of the shatterproof housing is to ensure, should a faulty bottle be used, that glass is not sprayed over the user.

The shatterproof housing may be formed of a translucent plastics material so that one can see the bottle in place and can see the aerating step. The manually operable valve is preferably actuable by a lever which is pivotally mounted on the housing and the safety valve is normally in the open position and is closed by the lever when the latter is actuated to open the manually operable valve. This means that when one has released the lever, after the pressurizing step, the safety valve, which is communicating with the space above the diaphragm, is opened to release pressure above the diaphragm to enable the bottle to be removed readily.

Advantageously, the shatterproof housing and the lever are provided with cooperable portions which abut when the shatterproof housing is pivoted to a position to allow the bottle to be inserted or removed, so that the lever cannot be actuated at that time.

It has been found advantageous for the nozzle to be of a length to extend only to a midportion of the length of the bottle and for the nozzle orifice to be of such a size, having regard to the pressure of gas in the cylinder, that the gas stream just reaches the bottom of the bottle.

This gives a longer dwell time for the gas in the water and increases the dissolving action of the gas in the water. It has been found that by this means one can significantly reduce the necessary pressure and reduce the quantity of gas required fully to aerate the water in the bottle. This obviously has significant advantages both from a safety point of view and from economy of the carbon dioxide. This effect is enhanced if the nozzle is arranged at an acute angle to the axis of the bottle when mounted in the appliance, so that a swirling action of the gas is produced as it enters the bottle.

Preferably the diaphragm is connected to the stopper by a necked down portion which allows the stopper to move relative to the diaphragm which facilitates the insertion of the bottle. If the nozzle passes through the stopper with a clearance, the clearance will provide the communication between the interior of the bottle and the space above the diaphragm which provides a simple structure. The diaphragm preferably has a peripheral sealing rim on its top and bottom surface to seal to the shatterproof housing.

In order that the invention may more readily be understood, the following description is given, merely by way of example, reference being made to the accompanying drawings, in which:

FIG. 2 is a top plan view of the appliance of FIG. 1 with the actuating lever removed;

FIG. 3 is a scrap section taken along the line III—III of FIG. 2; and

FIG. 4 is a plan view of the first and second hinge plates for mounting the shatterproof housing of the appliance of FIG. 1.

Figure 1:
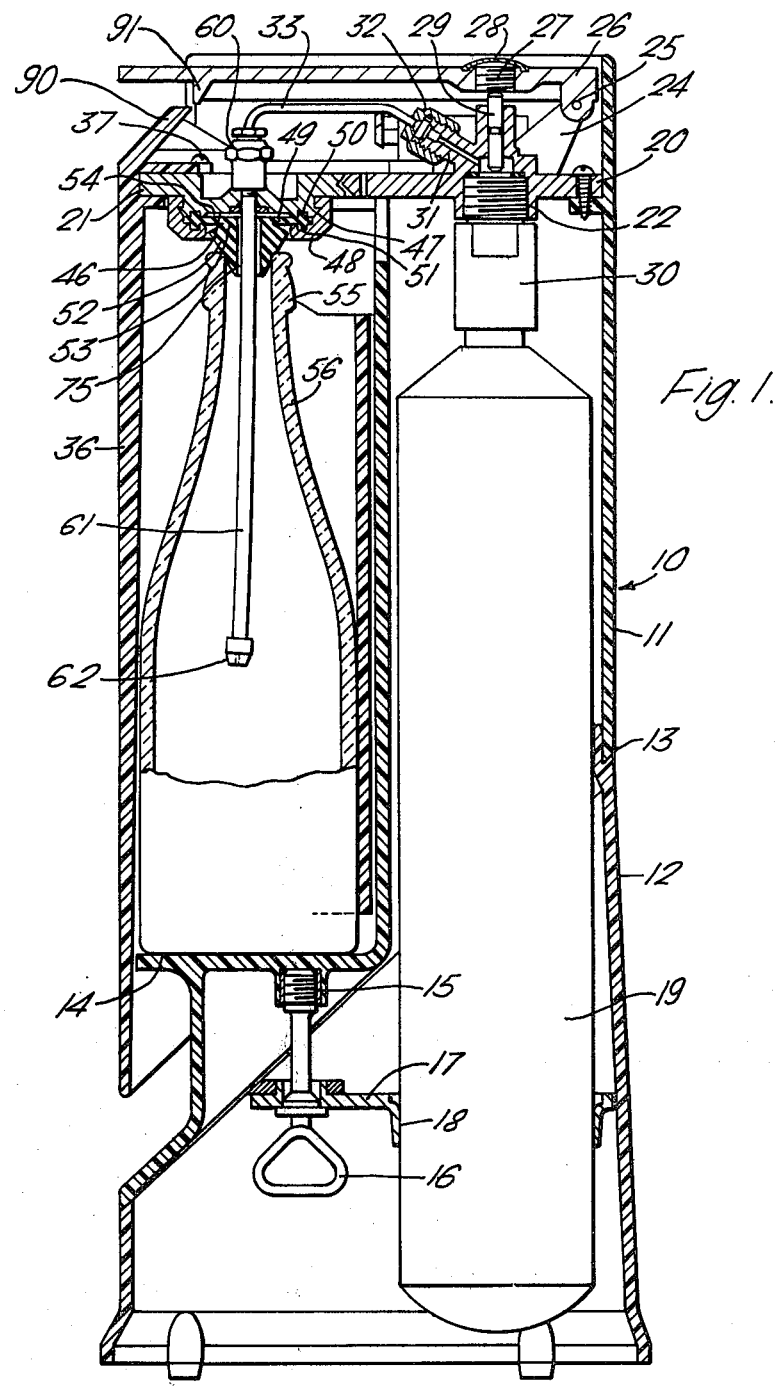
FIG. 1 is a side elevation, in cross-section, of one embodiment of appliance according to the invention.

Referring now to FIG. 1 of the drawings, there is illustrated an appliance including a casing indicated by the general reference numeral 10. This casing includes a top portion 11 and a bottom portion 12 which can be fitted together at the junction line 13 which, it will be noted, is inclined at approximately 45° to the horizontal. The casing includes, on the left side as viewed in FIG. 1, a fixed portion 14 and below this fixed portion is provided a bush 15 into which can be threaded a turn key 16. The turn key is cooperable with a plate 17 which has an aperture 18 therein to encompass a carbon dioxide cylinder 19.

At the upper end of the housing part 11 is mounted a first hinge plate 20 which is hinged to a second hinge plate 21 in a manner to be described in more detail later. The hinge plate 20 has a fixing point 22 for screwing the carbon dioxide cylinder 19 in place.

A lug 24 carries pivot pins 25 for mounting an actuating lever 26. This lever includes a threaded insert 27 covered by a cap 28, the insert 27 bearing on a valve operating pin 29 which operates the valve 30 at the upper end of the cylinder 19. The insert 27, after removing the cover 28, can be screwed up or down to give the correct degree of operation of the valve 30.

Extending at an angle from the upper portion of the first hinge plate 20 is a hollow spigot 31 to which is connected, via a coupling 32, a flexible pipe 33.

The casing is provided with a shatterproof housing 36 which is formed of translucent plastics material. This shatterproof housing 36 is in the form of a tube and can be made of a single thickness of plastics material, as shown, or preferably of two thicknesses of plastics material. The tube 36 is secured by screws 37 to the second hinge plate 21. If reference is made to FIG. 4, it will be observed that the hinge plate 20 is provided with two arms 38 each provided with a transverse bore 39. In these transverse bores are mounted pins 40 which engage in blind holes 41 in the second hinge plate 21. This second hinge plate is provided with a small recess 42 which cooperates with a small projection 43 carried by a narrow bridge portion 44 of the first hinge plate 20. This arrangement allows the second hinge plate to pivot about the axes of the bores 41 relative to the first hinge plate and the projection 43 and recess 42 act as a resilient buffer for the second hinge plate.

This second hinge plate is formed with a central bore and an upstanding spigot 45. Referring again to FIG. 1, it will be seen that the second hinge plate has a recess 46 on its lower surface which communicates (in a manner not shown) with the spigot 45. A peripheral bead 47 on a downwardly projecting portion of the second hinge plate 21 receives a clamping ring 48 which holds in place a flexible diaphragm 49 which is provided with peripheral ribs 50 and 51 on its upper and lower surfaces. A stopper 52 is connected to the diaphragm 49 by a necked down portion 53 so that the stopper is movable somewhat. The recess 46 and the diaphragm 49 together form a space 54 above the diaphragm, the area of the diaphragm wall forming the lower face of this space being substantially greater than the area of the stopper when engaged by the neck 55 of a bottle 56 mounted within the shatterproof housing 36 and standing on the casing portion 14.

The tube 33 is connected via a suitable connection 60 to a nozzle 61 which has, at its lower end, a discharge orifice 62. It will be noted that the lower end of the nozzle carrying the orifice 62 is at a midportion of the length of the bottle so that there is a substantial amount of bottle volume therebelow.

A safety overpressure valve 70 (FIG. 2) is mounted at the top of the casing and is normally in the open position. It will be seen that this safety valve has a spring-loaded plunger 71, an inlet spigot 72 and an outlet spigot 73. The inlet spigot 72 is connected by a flexible pipe 76, shown in phantom in FIG. 2, to the spigot 45 on the top of the second hinge plate 21. In the normal position of the valve, therefore, communication is available between atmosphere and the space 54 above the diaphragm and via the clearance 75 between the stopper 52 and the nozzle 61, to the interior of the bottle 56.

If reference is made to FIG. 3, it will be seen that the actuating lever 26, which is viewed from the other side in this Figure, is provided with an extension 80 which normally holds the plunger 71 in a position to open the valve 70. When the lever 26 is depressed, the spring on the plunger 71 moves the plunger outwardly to close the valve 70.

In use of the appliance, the bottle 56 is removed and is about three quarters filled with water. The shatterproof housing 36 is pivoted outwardly to allow the bottle to be inserted in the bottom with the nozzle 61 extending into the water in the bottle. The bottle is pushed upwardly to engage the stopper 52 and the shatterproof housing is then pivoted back to the position illustrated in FIG. 1. The operator then depresses the actuating lever 26 which opens the valve 30 so that carbon dioxide passes up through this valve, along the spigot 31, through the flexible pipe 33 and the nut 60 into the nozzle 61, from which it is projected through the orifice 62. The axis of the nozzle is preferably at an acute angle to the axis of the bottle, so that the gas streaming out of the nozzle orifice 62 is caused to swirl. The size of the orifice 62 is chosen, relative to the pressure of the gas arriving at the nozzle, so that it just and only just touches the bottom of the bottle. The gas will therefore readily dissolve in the water in the bottle and it has been found that this arrangement achieves a more efficient use of the carbon dioxide than previously known appliances. It also means that the pressure within the bottle can be less, so that any danger of the bottle exploding is reduced.

It will be understood that when the lever 26 is depressed, valve 70 is closed by the movement of the extension 80. The gas entering the bottle 56 will try to escape via the stopper 52, but the area of the diaphragm is much greater than the area of the stopper which is presented to the gas, so that the diaphragm flexes downwardly pushing the stopper firmly into place.

The aeration step is carried out until the safety valve 70 begins to leak indicating that the device has reached the desired pressure. The lever 26 is then released, which in turn releases the safety valve so that the gas pressure is released, allowing the diaphragm to flex upwardly so that the bottle can readily be removed.

The number of operations which have to be carried out are significantly less than in known appliances of this type.

Because the shatterproof housing is transparent, one can see operation of aeration taking place and this is quite pleasing.

Because the valve 70 is normally open, should somebody accidentally leave the bottle in, then any leak occurring in the valve 30 will not cause a dangerous situation.

When one wishes to replace the cylinder 19, the turn key 16 is released so that the two housing parts 12 and 11 can be taken apart which will facilitate unscrewing of the cylinder 19 from the portion 22 of the plate 20.

It will be seen that the top end of the shatterproof housing is provided with a projection 90 which is engageable, when the shatterproof housing is pivoted outwardly, with a downward projection 91 on the actuating lever. The purpose of this is to ensure that the actuating lever cannot be operated when the shatterproof housing is in its outer position, thus providing an additional safety feature and reducing possible loss of gas.

We claim:

1. An appliance for making an aerated beverage comprising a casing, means for mounting a container of pressurized carbon dioxide in said casing, a manually operable valve to control the outflow of carbon dioxide from said container, a nozzle connected to said manually operable valve to receive carbon dioxide from said valve, means for mounting a bottle containing water, so that the nozzle is immersed in the water in said bottle, a flexible diaphragm surrounding the upper end of the nozzle, a stopper carried by the diaphragm and closing the neck of the bottle when so mounted, a space formed above the diaphragm communicating with the interior of the bottle when mounted with the stopper in its neck, the upwardly projected area of the diaphragm forming a wall of said space being greater than the downwardly projected area of said stopper, whereby the pressure of the carbon dioxide urges the stopper into engagement with the neck of the bottle, and an overpressure safety valve communicating with the space above the diaphragm.

2. An appliance as claimed in claim 1, wherein said mounting means comprises a shatterproof housing pivotally mounted on said casing and a fixed portion of said casing for supporting the bottom of the bottle.

3. An appliance as claimed in claim 2, wherein said shatterproof housing is formed of a translucent plastics material.

4. An appliance as claimed in claim 1, wherein said safety valve is normally in the open position, and further comprising a lever pivotally mounted on said casing and positioned to actuate said manually operable valve, and means on said lever to close said safety valve when said lever is actuated.

5. An appliance as claimed in claim 4, wherein said mounting means includes a shatterproof housing pivotally mounted on said casing and a fixed portion of said casing for supporting the bottom of the bottle, and wherein said lever and shatterproof housing further comprise cooperable portions which abut when the shatterproof housing is pivoted to a position to allow the bottle to be inserted or removed, effective to prevent the lever from being actuated at that time.

6. An appliance as claimed in claim 1, wherein said nozzle is of a length to extend into a midportion of the length of the bottle, and wherein the nozzle orifice is of a size, relative to the pressure of gas in the cylinder, whereby the gas stream just reaches the bottom of the bottle.

7. An appliance as claimed in claim 6, wherein said nozzle is arranged at an acute angle to the axis of the bottle, when mounted in the mounting means, effective to produce a swirling action of the gas in the bottle.

8. An appliance as claimed in claim 1, wherein said diaphragm is connected to said stopper by a necked down portion allowing the stopper to move relative thereto.

9. An appliance as claimed in claim 1, wherein said nozzle passes through said stopper with a clearance, and wherein said clearance provides a communication between the interior of the bottle and the space above the diaphragm.

10. An appliance as claimed in claim 1, and further comprising peripheral sealing ribs on the opposite faces of said diaphragm.

11. A device for sealing a mouth of a bottle while introducing a gas into a liquid contained in the bottle, the gas being contained in a source under pressure, the bottle having an interior, the mouth and a bottom wall opposite the mouth, the device comprising:

a base;

a holder fixed relative to and spaced above the base, the holder being spaced from the base so that the bottle is engagable between the base and holder with the bottom of the bottle resting on the base and the holder engaged with the mouth;

the holder including a chamber open at one end, the holder further including a diaphragm which is deformable and having a periphery and opposed top and bottom surfaces, the diaphragm connected at the periphery to the holder across the open one end of the chamber with the top surface adjacent the chamber and the bottom surface opposite the chamber, the holder further including an engagement member which is deformable carried by the bottom surface of the diaphragm so that the member is suspended from the holder by the diaphragm, the member being engagable with the mouth of the bottle while the bottle is engaged between the base and holder, the holder being free of the bottle except for the engagable member, the diaphragm and member including a passage therethrough so that while the bottle is engaged between the holder and base the chamber and interior of the bottle are in communication, the holder further including a pipe means connected to the source, the pipe means passing through the passage for introducing the gas into the liquid in the bottle, the top surface of the diaphragm having an area in the chamber and the member having an area which is exposable to the gas in the bottle, the area of the top surface being greater than the area of the member which is exposable to the gas, so that when the bottle is engaged between the base and holder the member is engaged against the mouth with a low pressure due to a deformation of the diaphragm and the member, thereafter the gas being introduced into the liquid and passing through the passage into the chamber where the gas exerts a sealing force on the area of the top surface of the diaphragm which is greater than an opening force exerted by the gas on the area of the member exposed to the gas in the bottle, the sealing force increasing as the pressure of the gas increases to seal the mouth of the bottle.

* * * * *

UNITED STATES PATENT AND TRADEMARK OFFICE
CERTIFICATE OF CORRECTION

PATENT NO. : 4,298,551
DATED : November 3, 1981
INVENTOR(S) : RUNE F. R. ADOLFSSON et al It is certified that error appears in the above—identified patent and that said Letters Patent is hereby corrected as shown below:

On the title page, insert

-- (30) Foreign Application Priority Data

August 2, 1978    SWEDEN ................ 7808346-6

Signed and Sealed this

Ninth Day of March 1982

[SEAL]

Attest:

GERALD J. MOSSINGHOFF

Attesting Officer    Commissioner of Patents and Trademarks

Disclaimer 4,298,551.—*Rune F. R. Adolfsson,* Stockholm and *Dietrich W. Gellert Ekero,* both of Sweden. UNAVAIL FOR ACTION N PP UNAVAIL. Patent dated Nov. 3, 1981. Disclaimer filed Jan. 27, 1986, by the assignee, *Thorn EMI Appliances.*

Hereby enters this disclaimer to all claims for the remaining term of said patent.

[*Official Gazette April 8, 1986.*]

REEXAMINATION CERTIFICATE (538th)

United States Patent [19]
Adolfsson et al.

[11] B1 4,298,551
[45] Certificate Issued   Jul. 22, 1986

[54] APPLIANCE FOR MAKING AN AERATED BEVERAGE

[75] Inventors: Rune F. R. Adolfsson, Stockholm; Dietrich W. Gellert, Ekero, both of Sweden

[73] Assignee: Thorn Svenska A.B., Solna, Sweden

Reexamination Request:
No. 90/000,873, Oct. 4, 1985

Reexamination Certificate for:
Patent No.: 4,298,551
Issued: Nov. 3, 1981
Appl. No.: 62,943
Filed: Aug. 2, 1979

Certificate of Correction issued Mar. 9, 1982.

Disclaimer of claims 1-11 Filed: Jan. 27, 1986 (1065 O.G. 11)

[30] Foreign Application Priority Data

Aug. 2, 1978 [SE]   Sweden ............................. 7808346

[51] Int. Cl.[4] .............................................. B01F 3/04
[52] U.S. Cl. .................................. 261/121 R; 99/275; 99/323.1; 137/854; 137/859; 215/355; 222/563; 261/64 B; 261/DIG. 7
[58] Field of Search ............. 261/64 R, 64 B, 121 R, 261/122-124, DIG. 7; 222/563; 215/355, 361, 363; 137/854, 859; 99/275, 323.1, 323.2; 251/127

[56] References Cited

U.S. PATENT DOCUMENTS

| | | | |
|---|---|---|---|
| 2,173,571 | 9/1939 | Jesnig | 251/119 |
| 2,394,911 | 2/1946 | Griswold | 137/153 |
| 2,600,901 | 6/1952 | Meldau | 261/121 R |
| 2,732,117 | 1/1956 | Hillis | 226/111 |
| 2,805,846 | 9/1957 | Dewan | 261/121 R |
| 3,337,197 | 8/1967 | Iannelli | 261/160 |
| 3,599,657 | 8/1971 | Maldavs | 137/102 |
| 3,953,550 | 4/1976 | Gilbey | 261/64 R |
| 4,028,441 | 6/1977 | Richards | 261/36 R |

FOREIGN PATENT DOCUMENTS 1468469   3/1977   United Kingdom .

*Primary Examiner*—Richard L. Chiesa

[57] ABSTRACT

An appliance for making an aerated beverage, e.g. for domestic use, comprising a casing in which is mounted a pressurized container of carbon dioxide which is controlled by a manually operable valve, the operation of which is worked by a finger actuable lever. A nozzle is connected to the valve to receive carbon dioxide therefrom and inject it into water in a bottle when the bottle is mounted with the nozzle immersed in the water. A flexible diaphragm surrounds the upper end of the nozzle and carries a stopper which closes the neck of the bottle when so mounted. A space is formed above the diaphragm which communicates with the interior of the bottle when mounted with the stopper in its neck, and the upwardly projected area of the diaphragm forming the lower wall of the space is greater than the downwardly projected area of the stopper, whereby the pressure of the carbon dioxide urges the stopper into engagement with the neck of the bottle, and an overpressure safety valve is provided in communication with the space above the diaphragm.

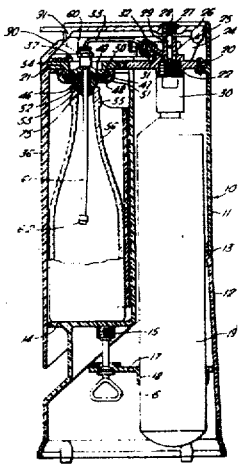

REEXAMINATION CERTIFICATE ISSUED UNDER 35 U.S.C. 307

THE PATENT IS HEREBY AMENDED AS INDICATED BELOW:

AS A RESULT OF REEXAMINATION, IT HAS BEEN DETERMINED THAT:

Claims 1-11 are now disclaimed.

* * * * *